United States Patent
Chen

(10) Patent No.: US 8,273,175 B2
(45) Date of Patent: Sep. 25, 2012

(54) COMPOSITIONS AND METHODS FOR PROTECTION OF REINFORCED CONCRETE

(75) Inventor: Sung-Wei Chen, Las Vegas, NV (US)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

(21) Appl. No.: 13/392,800

(22) PCT Filed: Jan. 26, 2011

(86) PCT No.: PCT/SG2011/000035
§ 371 (c)(1),
(2), (4) Date: Feb. 27, 2012

(65) Prior Publication Data
US 2012/0189794 A1    Jul. 26, 2012

(51) Int. Cl.
| | |
|---|---|
| C04B 24/26 | (2006.01) |
| C04B 103/61 | (2006.01) |
| C04B 111/26 | (2006.01) |
| C08K 5/098 | (2006.01) |
| C08L 27/06 | (2006.01) |

(52) U.S. Cl. ........ 106/823; 106/644; 106/711; 106/724; 106/733; 106/728; 106/802; 106/810; 106/815; 106/819; 524/3

(58) Field of Classification Search .......... 106/644, 106/711, 724, 733, 802, 815, 819, 823; 524/3
See application file for complete search history.

(56) References Cited

U.S. PATENT DOCUMENTS

| | | | |
|---|---|---|---|
| 3,865,779 A * | 2/1975 | Oya et al. ............ | 524/7 |
| 4,391,757 A | 7/1983 | Kugele et al. | |
| 5,843,524 A | 12/1998 | Wimolkiatisak et al. | |
| 5,922,124 A * | 7/1999 | Supplee ............ | 106/802 |
| 6,176,920 B1 * | 1/2001 | Murphy et al. ....... | 106/711 |
| 7,048,873 B1 | 5/2006 | Miksic et al. | |
| 2004/0103814 A1 | 6/2004 | Shin et al. | |
| 2010/0234508 A1 | 9/2010 | Michel et al. | |

FOREIGN PATENT DOCUMENTS

| | | | |
|---|---|---|---|
| JP | 59-196351 | | 11/1984 |
| JP | 2001239522 A | * | 9/2001 |
| JP | 2001240441 A | * | 9/2001 |
| KR | 100871560 | | 12/2008 |
| SU | 1444318 A1 | * | 12/1988 |
| WO | WO-95/21885 | | 8/1995 |
| WO | WO-2007/060660 | | 5/2007 |

OTHER PUBLICATIONS

Aggarwal, L.K. et al., "Properties of polymer-modified mortars using epoxy and acrylic emulsions," Construction and Building Materials, 2007, vol. 21, pp. 379-383.

Hybart, F.J. et al., "The action of tridecyl phosphite in the stabilization of poly(vinyl chloride) with metal soaps," Journal of Applied Polymer Science, Mar. 1972, vol. 16, pp. 715-723.

International Search Report and Written Opinion for PCT/SG2011/000035 mailed Mar. 21, 2011.

Iida, T. et al., "Stabilization of poly(vinyl chloride). III. Synergism between metal soaps and masking agents on the stabilization of poly(vinyl chloride)," Journal of Applied Polymer Science, Aug. 1977, vol. 21, pp. 2041-2050.

Saraswathy, V. et al., "Evaluation of Cementitious Repair Mortars for Corrosion Resistance," Portugaliae Electrochimica Acta, 2008, vol. 26, No. 5, pp. 417-432.

Vymazal, Z. et al., "Effect of stabilizers in the thermal treatment of PVC-XVI : Study of the stabilization efficiency of antimony tris(isooctyl thioglycolate) in PVC," European Polymer Journal, 1984, vol. 20, No. 9, pp. 879-882.

Wypych, G., "Chapter 11—Principles of Stabilization," PVC Degradation & Stabilization, ChemTec Publishing, 2008, pp. 271-274.

* cited by examiner

*Primary Examiner* — Anthony J Green
(74) *Attorney, Agent, or Firm* — Foley & Lardner LLP

(57) ABSTRACT

PVC compositions, concrete composition including the PVC compositions, and reinforced concrete structures that contain the concrete compositions are described. Methods for manufacturing the reinforced concrete structures of the present technology, methods for repairing reinforced concrete structures having corroded rebar, and methods for reducing rebar corrosion in reinforced concrete structures are also described.

23 Claims, No Drawings

COMPOSITIONS AND METHODS FOR PROTECTION OF REINFORCED CONCRETE

CROSS-REFERENCE TO RELATED APPLICATIONS

This application is a national stage application of International Application Ser. No. PCT/SG2011/000035, filed on Jan. 26, 2011, the entire contents of which is hereby incorporated by reference as if fully set forth herein.

BACKGROUND

Corrosion is a common cause of the deterioration of steel reinforced concrete structures, particularly those exposed to chloride ions from sea water. The hydrated cement present in reinforced concrete is a porous alkaline solid, which usually provides good protection against steel rebar corrosion. In the alkaline pore solution in set cement (pH 12.5-13.5), a protective oxide film is formed over the steel rebar, rendering it passive. However, the rebar corrodes when the protective oxide film is destroyed by chloride or carbonate ions penetrating the concrete. The chloride ions, present in sea water, may penetrate the concrete and raise the pH required to stabilize the passive film to a value which exceeds that of a saturated calcium hydroxide solution. Corrosion of the rebar results under such circumstances. Because the chloride ions penetrate concrete faster than carbonate ions, chloride ion penetration is the primary cause of corrosion in reinforced concrete.

When rebar in reinforced concrete corrodes, the reinforced concrete must be repaired to avoid further deterioration of the rebar and the collapse of the structure that it holds. Rebar also needs protection against such corrosion. For corrosion repair and protection, latexes of one or more of polyvinyl acetate and copolymers of vinyl acetate-ethylene, styrene-butadiene, styrene-acrylic, and acrylic and styrene butadiene rubber emulsions may be mixed with concrete and used. However, a drawback of using such latex based polymer systems is that they may re-emulsify in humid alkaline conditions such as those present in reinforced concrete.

SUMMARY

The present technology relates to compositions and methods for reducing or preventing the corrosion of rebar or other metallic objects in reinforced concrete, particularly reinforced concrete exposed to chloride ions such as in a marine environment. In one aspect, the present technology provides a composition including polyvinyl chloride (PVC) and about 10 wt % to about 40 wt % of a stabilizer based on the weight of the PVC. In one embodiment, the stabilizer is selected from an organotin stabilizer, an organozinc stabilizer, a metal soap stabilizer, a lead stabilizer, an epoxide stabilizer, an organoantimony stabilizer, and/or a mixture of any two or more thereof.

In another aspect, the present technology provides a concrete composition including concrete and the PVC composition of the present technology in an amount from about 0.1% to about 40% by weight of the concrete.

In another aspect, the present technology provides concrete structures including rebar and a concrete composition of the present technology.

In another aspect, the present technology provides methods of manufacturing a concrete structure including encasing rebar or other metallic objects in whole or in part with the concrete composition of the present technology to provide the concrete structure.

In another aspect, the present technology provides a method of repairing a concrete structure including applying the concrete composition of the present technology to any damaged area of the concrete structure. Such damaged areas include, without limitation, areas including cracks, areas that have lost concrete, and areas which include corroded rebar.

In another aspect, the present technology provides methods of reducing or preventing corrosion of a reinforced concrete structure including applying the concrete composition of the present technology to the surface of the reinforced concrete structure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The illustrative embodiments described in the detailed description, drawings, and claims are not meant to be limiting. Other embodiments may be utilized, and other changes may be made, without departing from the spirit or scope of the subject matter presented here.

The following terms are used throughout as described below, unless context clearly indicates otherwise.

Alkyl groups include straight chain and branched chain alkyl groups having from 1 to 26 carbon atoms, or, in some embodiments, from 1 to 20, 1 to 16, 1 to 12, 1 to 8, or 1 to 4 carbon atoms. Specific examples of the number of carbon atoms includes 1, 2, 3, 4, 5, 6, 7, 8 10, 12, 14, 16, 18, 20, 22, 24, 26, and ranges between any two of these values. Examples of straight chain alkyl groups include, but are not limited to, methyl, ethyl, n-propyl, n-butyl, n-pentyl, n-hexyl, n-heptyl, n-octyl groups, n-dodecyl, and n-icosyl groups. Examples of branched alkyl groups include, but are not limited to, isopropyl, iso-butyl, sec-butyl, tort-butyl, neopentyl, isopentyl, and 2,2-dimethylpropyl groups.

Alkenyl groups include straight and branched chain alkyl groups as defined above, except that at least one double bond exists between two carbon atoms. Thus, alkenyl groups have from 2 to 26 carbon atoms, or in some embodiments, from 2 to 20, 2 to 16, 2 to 12, 2 to 8, or 2 to 4 carbon atoms. Specific examples of the number of carbon atoms includes 2, 3, 4, 5, 6, 7, 8 10, 12, 14, 16, 18, 20, 22, 24.26, and ranges between any two of these values. Examples include, but are not limited to vinyl, allyl, —CH—CH($CH_3$), —CH—C($CH_3$)$_2$, —C($CH_3$)—$CH_2$, —C($CH_3$)=CH($CH_3$), —C($CH_2CH_3$)=$CH_2$, among others.

Acyl groups have the formula —C(O)$R^{40}$ wherein $R^{40}$ is an alkyl or alkenyl group.

Stabilizers, as used herein, are ingredients that are added to a PVC polymer in order to reduce or prevent hydrogen chloride evolution during processing and/or to give the finished article improved or optimized heat stability. Without being bound by mechanism, stabilizers act by complexing with or sequestering chloride ions. Therefore metals with an affinity for chloride ion may act as suitable stabilizers. Such metals include, without limitation, tin, lead, antimony, zinc, cadmium, barium, calcium, and potassium. Various carboxylate salts and chelates of these metals are useful as stabilizers. For metals that can form stable compounds having one or more carbon metal bonds, such as for example, tin, lead and antimony, such compounds may also act as stabilizers. These and other stabilizers may also have one or more metal sulfur bonds. Examples of stabilizers include, without limitation metal soap stabilizers, lead stabilizers, organotin stabilizers, organozinc stabilizers, organoantimony stabilizers and epoxides. The stabilizers may be used together with each other and with other components, such as diketones, e.g., and without limitation. beta diketones, or trialkyl phosphites. A variety of stabilizers suitable for the present technology are reported in Wypych, G., "PVC Degradation & Stabilization," 2nd Ed., ChemTec Publishing (2008); Iida, T., et al., "Stabilization of Poly(Vinyl Chloride). Ill. Synergism Between Metal Soaps and Masking Agents on the Stabilization of Poly(Vinyl Chloride)," *Journal of Applied Polymer Science* (2003) 21: 2041-2050; Hybart, F. J., and Rowley, G. N., "The Action of Tridecyl Phosphite in the Stabilization of Poly (Vinyl Chloride) with Metal Soaps," *Journal of Applied Polymer Science* (2003) 16: 715-723; and Vymazal, I. V., et al., "Effect of Stabilizers in the Thermal Treatment of PVC-CV1: Study of the Stabilization Efficiency of Antimony Tris (Isooctyl Thioglycolate) in PVC," *European Polymer Journal* (1984) 20: 879-882.

Rebar, as used herein, refers to steel-containing reinforcement supports including but not limited to bars, rods, mesh, grids, and plates that may incorporated into concrete to increase the tensile strength of the concrete.

Reinforced concrete, as used herein, refers to concrete including rebar.

PVC compositions that can sequester chloride ions, and concrete and reinforced concrete including such PVC compositions are disclosed. Reducing or preventing rebar corrosion in reinforced concrete that is in contact with chloride ions, such as, for example, marine reinforced concrete is also disclosed. PVC is stabilized with a variety of stabilizers that are capable of binding and/or sequestering chloride ion. The mechanism of binding/sequestration depends on the stabilizer used. When mixed with reinforced concrete, PVC, containing suitable amounts of the stabilizers, can sequester chloride ions, and partially or fully protect the rebar from chloride ion related corrosion. Thus, in one aspect, the present technology provides a composition including PVC and about 10 wt % to about 40 wt % of a stabilizer based on the weight of the PVC. In one embodiment, the stabilizer is selected from the group consisting of an organotin stabilizer, an organozinc stabilizer, a metal soap stabilizer, a lead stabilizer, an epoxide stabilizer, an organoantimony stabilizer, and a mixture of any two or more thereof.

The amount of stabilizer in the PVC composition may be varied considerably, depending on the thickness, desired use, and environment to which the composition may be exposed. The amount can be selected to reduce or prevent corrosion of rebar or other metallic items that may be in contact with the PVC composition. The amount may be selected to be sufficient to sequester significant amounts of chloride ions in the application at hand. For example, and without limitation, such amounts of stabilizers may sequester chloride ions at a concentration of up to about 13.7 kg/m$^3$ at the rebar depth. Thus, in one embodiment, the composition includes about 15 wt % to about 35 wt % of the stabilizer based on the weight of the PVC. In some embodiments, the composition includes about 20 wt % to about 30 wt % of the stabilizer or from about 10 wt % to about 20 wt % of the stabilizer based on the weight of the PVC. The composition can be readily optimized. For example, use in an environment with high salt concentration may lead to selection of a higher percent stabilizer. As an additional example, use of a thick layer of concrete around a metallic object may allow a lower percent stabilizer compared to the percent stabilizer desired when using a thin layer of concrete.

In some embodiments of the present technology, the stabilizer is an organotin stabilizer. Organotin stabilizers, as used herein, refer to mono- and dialkyl derivatives of tin mercaptides and carboxylates such as monoalkyl and dialkyl tin thioglycolates, mercaptopropionates, maleates and the like. Organotin stabilizers include, e.g., methyl- and dimethyl-, butyl- and dibutyl-, and octyl- and dioctyl-tin thioglycolates; methyl- and dimethyl-, butyl- and dibutyl-, and octyl- and dioctyl-tin mercaptopropionates. In illustrative embodiments, the organotin stabilizers include but are not limited to dialkyltinmaleate, dialkyltin bis(maleate monoester), dialkyltin bis(thioglycolate ester), and dialkyltin betamercaptopropionate. In another illustrative embodiment, the organotin stabilizers include $Bu_2Sn(IOTG)_2$, $(octyl)_2Sn(IOTG)_2$, and $Bu_2Sn(IOM)_2$ wherein IOTG is isooctyl thioglycolate and IOM is isooctyl maleate. In some embodiments, the organotin stabilizer is selected from alkyltin thioglycolate, dialkyltin thioglycolate, alkyltin mercaptopropionate, dialkyltin mercaptopropionate, alkyltin maleate, and dialkyltin maleate. In some embodiments, the alkyl groups of the alkyltin and dialkyltin stabilizers have 1-10 or 1-8 carbon atoms.

In some embodiments, the organotin stabilizer has the structure of Formula IA. Formula IB, or Formula IC:

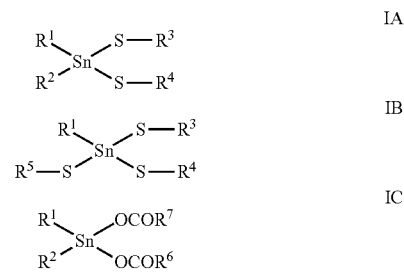

wherein $R^1$ and $R^2$ are independently a $C_1$-$C_{10}$ alkyl group; $R^3$, $R^4$, and $R^5$ are independently —$CH_2$—$CO_2$—$R^8$, —$(CH_2)_2$—$CO_2$—$R^8$, or $R^8$
$R^6$ and $R^7$ are independently —CH=CH—$R^9$ or $R^9$;
$R^8$ is a $C_1$-$C_{10}$ alkyl group; and
$R^9$ is a $C_1$-$C_{26}$ alkyl group.

In some embodiments, the organotin stabilizer is of Formula IA or IB, wherein $R^1$ and $R^2$ are independently a methyl, butyl, or octyl group. In other embodiments, the organotin stabilizer is of Formula IC, wherein $R^1$ and $R^2$ are independently a butyl or an octyl group. In some embodiments, $R^3$-$R^5$ is 2-ethylhexyl or isooctyl. In some embodiments, the organotin stabilizer is a tin salt of maleic acid or a tin salt of a half ester of maleic acid.

In some embodiments of the present technology, the stabilizer is an organozinc stabilizer. Organozinc stabilizers, as used herein, refer to zinc salts of long chain carboxylic acids (i.e., an unbranched $C_8$-$C_{26}$ alkyl or alkenyl group hearing a terminal carboxyl group). Organozinc stabilizers thus include but are not limited to alkyl carboxylates such as zinc salts of fatty acids (for example, laureate, palmitate, stearate, erucate, behenate, abietates, and the like), as well as certain zinc soaps (see metal salts below). Organozinc stabilizers may be used together with epoxides (see below) or diketones, such as beta diketones, for example and without limitation, of formula R—CO—($CH_2$)—C(O)—R', wherein R and R' are independently a phenyl, $C_{12}$-$C_{22}$ alkyl or $C_{12}$-$C_{22}$ alkenyl group. A non-limiting example of a beta diketone is dibenzoyl methane.

In some embodiments of the present technology, the stabilizer is a metal soap. Metal soap stabilizer, as used herein, refers to $M(OCOR^{10})_n$ wherein $R^{10}$ is an alkyl or alkenyl group, such as a $C_1$-$C_{26}$ alkyl or a $C_2$-$C_{26}$ alkenyl group, M is a mono- or divalent metal ion, and n is 1 or 2. When M is a divalent metal such as Zn, Cd, Ba, or Ca, n is 2, and when M is a monovalent metal, such as potassium, n is 1. In some embodiments, the metal soaps include, Cd/Ba soaps and Zn/Ca soaps. In some embodiments, the stabilizer is a metal soap having the formula $M$-$(OCOR^{10})_2$ wherein M is selected from zinc, barium, calcium, cadmium, and a mixture of any two or more thereof; and $R^{10}$ is a $C_8$-$C_{26}$ alkyl or alkenyl group. In some embodiments, $OCOR^{10}$ is a stearate, such as, e.g., zinc stearate or cadmium stearate.

In some embodiments the stabilizer is a lead stabilizer. Lead stabilizers, as used herein, refer to organic and inorganic lead-containing stabilizers such as but not limited to lead carboxylates, tribasic lead sulfate, dibasic lead stearate, lead stearate, lead phosphite, monobasic lead phthalate, lead carbonate, dibasic lead phosphite and other lead based salts that sequester/react with chloride ions.

In some embodiments of the present technology, the stabilizer is an organoantimony stabilizer. Organoantimony stabilizers, as used herein, refer to antimony-containing stabilizers wherein the antimony is attached to organothio groups, including, without limitation, alkylthio (e.g., $Sb(SR^a)_3$) such as, e.g., alkyl thioglycolate moieties (e.g., $Sb(SCH_2CO_2R^b)_3$), wherein $R^a$ and $R^b$ are alkyl groups. In some embodiments, the organoantimony stabilizer is of formula $Sb(SCH_2CO_2R^8)^3$, wherein $R^8$ is a $C_1$-$C_{10}$ alkyl group. In some embodiments, $R^8$ is isooctyl. Yet other organoantimony stabilizers include, without limitation, antimony tris(thioethyl laurate), and compounds with the structural formula $Sb(SCH_2CH(OR)CH_2XR')_3$, where R is H or $C_1$-$C_{18}$ acyl, $R^1$ is $C_1$-$C_{20}$ alkyl or $C_1$-$C_{18}$ acyl, and X is S or O.

In some embodiments of the present technology, the stabilizer is an epoxide stabilizer. Epoxide stabilizers, as used herein, include epoxy triglycerides, alkyl epoxy stearates, and epoxides of formula:

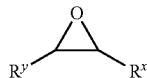

wherein $R^x$ and $R^y$ independently are $C_1$-$C_6$ alkyl or $C_1$-$C_6$ alkenyl group. In some embodiments, the epoxide stabilizer is an epoxy triglyceride (a glycerol triester of fatty acids in which one or more of the fatty acids bears an epoxy group(s)), or an alkyl epoxy stearate. In some embodiments, the epoxy triglyceride is an epoxidized vegetable oil. In some embodiments the vegetable oil epoxidized is soy bean oil (e.g., the mixture designated CAS 8013-07-8) or sunflower oil. In some embodiments, the epoxy triglyceride is an epoxidized trioleyl glycerate.

The PVC can generally be of any molecular weight. In some embodiments, the PVC used in the present compositions has a weight average molecular weight ranging from about 10,000 g/mol to about 100,000 g/mol. In some embodiments, the PVC has a weight average molecular weight ranging from about 31,000 g/mol to about 94,000 g/mol. In other embodiments, the PVC has a weight average molecular weight ranging from about 40,000 g/mol to about 80,000 g/mol, from about 50,000 g/mol to about 70,000 g/mol, or about 60,000 g/mol. A wide variety of PVC materials and products are commercially available. Non limiting example of commercially available PVC include OXYVINYL available from OXYCHEM/OCCIDENTAL and GEON DURACAP vinyl available from POLYONE.

In another aspect, the present technology provides concrete compositions including concrete and a PVC composition as described herein. In some embodiments or the present compositions, the PVC composition (PVC plus stabilizer) ranges in an amount from about 0.1% to about 40% by weight of the concrete. In other embodiments, the concrete composition includes concrete and a PVC composition as described herein in an amount from about 0.5% to about 30% by weight of the concrete, or in an amount from about 1% to about 20% by weight of the concrete, or in an amount from about 2% to about 10% by weight of the concrete. In some embodiments, the concrete composition further includes fibers. The fibers may be, for example, monofilament fibers. The fibers may be made of PVC or of other materials. In some embodiments, the fibers are polypropylene fibers. In some embodiments of the present concrete compositions, the PVC composition is in the form of fibers.

In another aspect, the present technology provides a concrete structure including rebar and a concrete composition of the present technology.

In another aspect, the present technology provides a method of manufacturing a concrete structure including encasing a rebar in whole or in part with the concrete composition of the present technology to provide the concrete structure.

In another aspect, the present technology provides a method of repairing a concrete structure including applying the concrete composition of the present technology to any damaged area of the concrete structure. The concrete structure can be made of conventional concrete, or can be made of the concrete compositions disclosed herein. The damage can be caused by any source, such as corrosion or physical damage, such as caused by a storm or collision with an object such as a ship.

In another aspect, the present technology provides a method of reducing or preventing corrosion of a reinforced concrete structure including applying the concrete composition of the present technology to the surface of the reinforced concrete structure. The concrete composition can be applied to a portion of the surface, or to the entire surface. The reduced corrosion is determined relative to an otherwise identical concrete structure with an applied conventional concrete material.

Within any of the four aspects above, in some embodiments, the concrete structure is in contact with an aqueous solution of chloride ions. The concentration of chloride ions can generally be any concentration, such as concentrations typically found in marine environments. Concentrations can vary from location-to-location. Relatively low concentrations can be found in fresh water environments, moderate concentrations can be found in brackish water environments, and relatively high concentrations can be found in ocean or salt water environments. Certain geographic locations such as the Caspian Sea, Dead Sea, or the Great Salt Lake may have relatively very high concentrations of chloride ions. Examples of chloride ion concentrations include from about 0.1 wt % to about 36 wt %, about 1 wt % to about 20 wt %, or about 2 wt % to about 10 wt %, of the chloride ions based on the total weight of the aqueous solution. Specific examples include about 0.1 wt %, about 1 wt %, about 2 wt %, about 3 wt %, about 4 wt %, about 5 wt %, about 10 wt %, about 15 wt %, about 20 wt %, about 25 wt %, about 30 wt %, about 35 wt %, and ranges between any two of these values. In some embodiments, the concrete structure is in contact with an aqueous solution of chloride ions ranging in chloride ion concentration from about 0.1 molar to about 6 molar, about 1 molar to about 5 molar, or about 2 molar to about 4 molar. In some embodiments, the concrete structure is a part of a sea wall, a retaining wall, a brine tank, a reverse osmosis plant, a tunnel, a bridge, a bridge piling, a bridge foundation, a pier, a seawall, a dock, a ship, a barge, a desalination plant, or a chemical plant. In some embodiments, the rebar is a stainless steel rebar. In some embodiments, the rebar is a carbon steel rebar.

PVC stabilizers suitable for use in the present compositions are commercially available or may be prepared by well known methods, or by methods that will be apparent based on the literature methods, to one skilled in the art. PVC compositions of the present technology may be prepared using the disclosed stabilizers and other additives such as plasticizers, impact modifiers, lubricants, fillers, and/or colorants using standard methods or methods that will be apparent to the skilled artisan based on the literature. For example, and without limitation, suitable tillers include $CaCO_3$, talc, and chalk; suitable lubricants include, waxes, fatty acids like stearic acid, and fatty alcohols; and suitable pigments include titanium oxide, chromium oxide, and cadmium oxide. In certain embodiments, the fillers may be present in up to about 50% by weight of the PVC composition. In certain embodiments, the lubricants may be present in an amount of about 1% to about 5% or about 2% to about 4% by weight of the PVC composition. In certain embodiments, the colorants may be present in an amount of up to about 20%, about 10%, or about 5% by weight of the PVC composition.

Methods of making concrete and reinforced concrete, each of which include polymers other than stabilizer containing PVC, are reported (see, for example, Aggarwal et al., Construction and Building Materials, 21 (2007) 379-383 and Saraswathy et al., Portugaliae Electrochimica Acta, 26/5 (2008) 417-432). Such methods and other reported methods may be adapted by the skilled artisan based on the present disclosure, and upon appropriate substitution of the polymers with stabilizer containing-PVC, for making the concrete compositions and rebar concrete structures of the present technology. In brief, Portland cement and PVC containing stabilizer, for example, 10-40 wt %, relative to the PVC, are mixed together in dry form to produce a mixture. The mixture can be combined with a suitable quantity of water to produce a thick slurry and poured or molded into the desired shape or structure.

Methods for testing chloride ion permeability in concrete compositions, and the chloride ion sequestering ability of concrete compositions including stabilizer containing-PVC, such as those of the present technology may be adapted by the skilled artisan from methods reported in Aggarwal et al., and Saraswathy et al., each supra. For the chloride-ion penetration test, concrete samples are immersed in a sodium chloride solution. The samples are split after the test and the split cross-sections are sprayed with sodium fluorescein and silver nitrate solution. The depth of the rim of each cross-section that changed to white is measured as chloride ion penetration depth. Such a method for testing chloride ion permeability is described in the EXAMPLES section below. Methods for testing rebar corrosion in reinforced concrete, and determining the protection against chloride induced rebar corrosion in concrete provided by the compositions and the methods of the present technology, may be adapted by the skilled artisan from reported methods, e.g., those reported in Saraswathy et al., supra. Such tests include the 90 days ponding test, macro cell corrosion tests, gravimetric weight loss determination, determining the time course of open-circuit potential, and impressed voltage test, each of which are described in the EXAMPLES section below.

EXAMPLES

The present technology is further illustrated by the following examples, which should not be construed as limiting in any way.

Example 1

PVC Composition

PVC compositions useful in accordance with the present technology may be prepared as follows. The ingredients listed in the table below are milled together at 150° C. for 5 minutes to prepare the PVC composition. The number and total amount of stabilizers are adjusted to range from about 10 wt % to about 40 wt % based on the weight of the PVC.

| No. | Ingredient | Amount by weight |
|---|---|---|
| 1 | PVC | 100 |
| 2 | Calcium Carbonate | 15-20 |
| 3 | Stearic Acid | 0-1 |
| 4 | $TiO_2$ | 0-1 |
| 5 | Paraffin wax | 0-1 |
| 6 | Tribasic Lead Sulfate | 0.5-20 |
| 7 | Dibasic lead sterate | 0.5-20 |
| 8 | Calcium sterate | 0.5-20 |
| 9 | Lead stearate | 0.2-20 |

Thus, the stabilizer amounts may be varied and one or more stabilizers may even be absent, provided that at least one stabilizer is present.

Example 2

Chloride Ion Penetration of Concrete Compositions

Ordinary Portland cement, grade 43, and quartz sand No. 10 are used for making the concrete composition test specimens. To study the effect of PVC-cement ratio on various properties, specimens are prepared by varying the PVC-cement ratio from 0% to 30% by mass of cement. As used herein, PVC refers to stabilizer containing-PVC (e.g., of Example 1), and PVC-cement refers to a concrete composition that includes stabilizer containing-PVC. A cement-sand ratio of 1:3 by mass is kept constant for all the specimens. For all the mixes, the water-cement ratio (w/c) is adjusted to maintain a constant flow between 110 and 120 mm. For chloride ion penetration tests, three prisms of 40 mm×40 mm×80 mm size are molded. After molding, the specimens are allowed to cure in the mold for first 24 hours. During this period the moulds are covered with a wet cloth and a polyethylene sheet. The specimens are then kept at 20±2° C. and 50±5% relative humidity (RH) for the next 27 days. PVC-cement specimens are not water-cured, while one set of control specimens, i.e., specimens without the PVC compositions are water cured and another is air cured.

For the chloride-ion penetration test, the cured samples are immersed in a 2.5% sodium chloride solution at 25° C. for 7 days. The samples are split after the test and the split cross-sections are sprayed with 0.1% sodium fluorescein and 0.1 N silver nitrate solution. The depth of the rim of each cross-section that changed to white is measured as chloride ion penetration depth. Samples prepared from concrete containing PVC compositions of the present technology will be found to have less chloride penetration than samples without such compositions.

Example 3

Chloride Ion Penetration of Concrete Compositions and Corrosion Resistance of Concrete Rebar The materials for use in this study include the following. Ordinary Portland cement of 43 grade as per IS 8112, river sand passing through 2.36 mm sieve, and PVC compositions containing various amounts of stabilizers.
Open Circuit Potential Measurements The embedded steel potentials for different repair systems exposed to chloride ion over time are measured periodically against a saturated calomel electrode (SCE) and the time course is plotted. Half portions of the concrete cylinders are cast using M20 concrete and kept immersed in water for 28 days. After 28 days, the specimens are taken out and the surface is dried and sand blasted to get a rough surface for proper bonding between the old and the new concrete. Cement slurry is applied over the rough surface and the remaining portion of the cylinder is filled with different repair mortars that include stabilizer containing-PVC. During casting, a 12 mm diameter and 100 mm long rebar is centrally embedded in the cylinder specimen of size 50 mm diameter and 100 mm height. From one of its end an electrical connection is taken out for potential measurements. The rebar is cleaned with pickling acid before embedding in concrete. After casting, the specimens are subjected to water curing, for 28 days. After the curing period, the cubes are taken out and dried for 24 hours and subjected to alternate wetting and drying in 3% NaCl solution. One cycle consists of three days immersion in 3% NaCl solution and three days drying in open atmosphere. Open circuit potential measurements are monitored periodically with time under wet condition. The process is continued for 90 days. From the above results potential vs. time plot is drawn using the average potentials obtained. Reinforced concrete samples prepared from concrete containing PVC compositions of the present technology will be found to have a lower negative open circuit potential than that found in samples without such compositions.
Impressed Voltage Test The same procedure as mentioned above is adopted for this experiment. During casting, a 12 mm diameter and 100 mm long rebar is centrally embedded in the cylindrical specimen of 50 mm diameter and 100 mm height. After 24 hours demolding, all the specimens are subjected to 7, 14, 21, 28, and 90 days of curing. After the specified curing period, the specimens are subjected to impressed voltage test by impressing 12 V between rebar anode and stainless steel cathode in 5% NaCl solution. The time taken for an initial crack is recorded for different systems. The time taken for an initial crack to form in reinforced concrete samples prepared from concrete containing PVC compositions of the present technology will be found to be longer than those of conventional concrete samples prepared lacking such compositions.
Rapid Chloride Ion Permeability Test Mortar discs of size 85 mm diameter and 50 mm thick are cast and allowed to cure for 28 and 90 days. After curing, the mortar specimens are subjected to the rapid chloride permeability test (RCPT) by impressing 60 V as per ASTM C1202. Two halves of a container of diameter 90 mm and 100 mm long are fixed on both sides of the concrete specimen. One side of the container is filled with 3% NaCl solution (connected to the negative terminal of the power supply) and the other side is filled with 0.3 N NaOH solution (connected to the positive terminal of the power supply). Current is measured every 30 minutes for up to 6 hours. Chloride contamination and temperature are also monitored every 30 minutes. Chloride concentration is determined by Mohr's method (see, e.g. P. Sandberg, "Studies of chloride binding in concrete exposed in a marine environment," *Cem. Concr. Res.*, 29-4 (1999) 473-477). From the results using current and time, chloride permeability is calculated in terms of coulombs at the end of 6 hours. As per ASTM C 1202, systems where the charge passed is less than 1000 coulomb are rated as "very low chloride permeable". The chloride permeability of reinforced concrete samples prepared from concrete containing PVC compositions of the present technology will be found to be lower than those of conventional concrete samples prepared lacking such compositions.
90 Days Ponding Test Mortar prisms of size 300 mm×150 mm×150 mm are cast with different repair mortars. These prisms are allowed to cure for 28 days and 3% NaCl solution is ponded over the upper side of the prism. These prisms are allowed to continuous ponding in 3% NaCl for up to 90 days, the core samples are taken at 20 mm and 40 mm depths, and analyzed for free chloride contamination. The chloride contamination is correlated with the permeability. The chloride contamination of reinforced concrete samples prepared from concrete containing PVC compositions of the present technology will be found to be lower than those of conventional concrete samples prepared lacking such compositions. As a result, the correlated permeability of the reinforced concrete samples will be lower than conventional concrete samples prepared lacking such compositions.
Macro Cell Corrosion Studies ASTM has evolved a standard for macro cell corrosion studies to evaluate the chemical admixtures in chloride-contaminated concrete (ASTM G109-2001). A half portion of a prism is cast with two-cathode CTD rebar of 12 mm diameter 300 mm length using M20 concrete. After 24 hours, the half portion of the prism is demolded and subjected to curing in water for 28 days. Next, the specimens are taken out and the surface is roughened using the sand blasting technique. Then the roughened surface is coated with cement slurry and the repair mortar is applied over the remaining portion with one 16 mm rebar at the top kept at the center of the mortar specimen at a cover of 20 mm from the top portion. After the application of the repair mortar the whole specimen is immersed in water for 7 days, the prisms are taken out, and the top portion is constructed with bund for ponding of a 3% NaCl solution. During exposure to salt solution, chloride ions tend to diffuse into the cover mortar and depassivate the steel positioned at the top level. The top 250 mm length bar will act as an anode while bottom rebar will act as a cathode. To accelerate galvanic corrosion, the area ratio of anode:cathode is kept at 1:2.

Before starting the experiment, the top and the bottom rebar are protected from the environment using some insulating material like araldite. Then, the top and bottom rebar are electrically short-circuited using a 100 ohm resistor. The galvanic and the macro cell current between top and bottom bars is measured once in 8 days at the end of wet cycle as per procedure outlined in ASTM G 109-2001. One cycle consists of 4 days of ponding in 3% NaCl and 4 days of drying in an open atmosphere. At the end of the 15th day, measurements are made and the solution is completely drained using sponge.

A 100-ohm resistor is placed between the top and bottom rebar and the potential difference V is measured. From this, the current (Ic) is calculated as Ic=V/100. Measurements are made for to 180 days of exposure. At the end of exposure period, the specimens are broken open and both the top and the bottom rebar are taken out for visual observation. The concrete sample near the anode rebar is collected and analyzed for alkalinity and chloride content. The top rebar and the extent of rusted area is observed visually. Visual inspection of reinforced concrete samples prepared from concrete containing PVC compositions of the present technology will find reduced or prevented corrosion as compared to conventional concrete samples prepared lacking such compositions. As a result, the degree of conferred protection against corrosion of the reinforced concrete samples will be higher than conventional concrete samples prepared lacking such compositions.

Gravimetric Weight Loss Determination

Half-portion cast concrete cylinders are taken and the surface is roughened using sand blasting. Then, the remaining portion is filled with different repair mortars by reinforcing with a 12 mm diameter and a 70 min long rebar embedded centrally in 50 mm diameter and a 100 mm long cylinder specimen. The initial weights of the rebar are taken before embedment in the mortar. During casting, 1% of chloride is added in the mortar mix to accelerate corrosion. After casting, the specimens are cured for 28 days. Next, all of the specimens are subjected to alternate wetting and drying in 3% NaCl solution. The process is continued for 180 days. After 180 days, the specimens are split open and visually examined for rust initiation. Next, all of the rebar are cleaned in inhibited hydrochloric acid as per method prescribed in ASTM G1-1995 to remove the rust and the final weight of the rebar is measured. From the initial and final weights, loss in weight due to corrosion is determined. Visual inspection of reinforced concrete samples prepared from concrete containing PVC compositions of the present technology will show reduced or prevented rust initiation as compared to conventional concrete samples prepared lacking such compositions. Additionally, measured weight loss of reinforced concrete samples prepared from concrete containing PVC compositions of the present technology will be lower than from conventional concrete samples prepared lacking such compositions. These two measurements will show that use of concrete containing PVC compositions of the present technology confers improved protection to embedded metallic objects such as rebar.

Example 4

Construction of a Bridge Pier Using Concrete Incorporating a PVC Composition

A 6'×12' bridge pier is constructed with 27 ASTM No. 14 steel reinforcing bars (Gerdeua Ameristeel) at each end, perpendicular to the cross-section. Two inches of cover and two inches of spacing is provided between all bars and the exterior of the concrete section. The concrete used for the pier is formulated to consist of 90% by volume of cement type III (having the composition shown in the table below) and 10% by volume of PVC fiber having a composition that include 20 wt % dibutyltin bis(2-ethylhexyl thioglycolate).

| Constituent | Weight Percent of Total Dry Weight |
|---|---|
| Tricalcium silicate (C3S) | 57% |
| Dicalcium silicate (C2S) | 19% |
| Tricalcium aluminate (C3A) | 10% |
| Tetracalcium aluminumferrite (C4AF) | 7% |
| MgO | 3% |
| $SO_3$ | 3.1% |
| CaO | 1.3% |

The time period before sufficient chloride ion will penetrate the concrete to the depth of the rebar and begin corroding the rebar will be longer than the equivalent structure-comprising concrete that lacks a PVC composition of the present technology.

EQUIVALENTS

The present disclosure is not to be limited in terms of the particular aspects and embodiments described in this application. Many modifications and variations can be made without departing from its spirit and scope, as will be apparent to those skilled in the art. Functionally equivalent compositions and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular compositions, methods, reagents, or compounds which can, of course, vary. It is also to be understood that the terminology used herein is for the purpose of describing particular aspects and embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A concrete composition comprising;
concrete and
a polyvinyl chloride (PVC) composition in an amount from about 0.1% to about 40% by weight of the concrete, wherein the PVC composition comprises:
PVC and about 10 wt % to about 40 wt % of a stabilizer based on the weight of the PVC, wherein the stabilizer is selected from the group consisting of an organotin stabilizer, an organozinc stabilizer, a metal soap stabilizer, a lead stabilizer, an organoantimony stabilizer, an epoxide stabilizer and a mixture of any two or more thereof.

2. The concrete composition of claim 1, wherein the PVC composition comprises about 15 wt % to about 35 wt % of the stabilizer.

3. The concrete composition of claim 1, wherein the PVC composition comprises about 20 wt % to about 30 wt % of the stabilizer.

4. The concrete composition of claim 1, wherein the PVC composition comprises about 10 wt % to about 20 wt % of the stabilizer.

5. The concrete composition of claim 1, wherein the organotin stabilizer is selected from the group consisting of alkyltin thioglycolate, dialkyltin thioglycolate, alkyltin mercaptopropionate, dialkyltin mercaptopropionate, alkyltin maleate, and dialkyltin maleate.

6. The concrete composition of claim 1, wherein the stabilizer is an organotin stabilizer of Formula IA, Formula IB, or Formula IC:

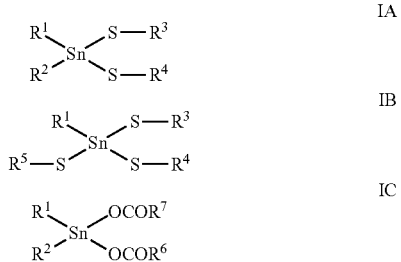

wherein $R^1$ and $R^2$ are independently a $C_1$-$C_{10}$ alkyl group; $R^3$, $R^4$, and $R^5$ are independently selected from —$CH_2$—$CO_2$—$R^8$, —$(CH_2)_2$—$CO_2$—$R^8$, or $R^8$
$R^6$ and $R^7$ are independently —CH=CH—$R^9$ or $R^9$;
$R^8$ is a $C_1$-$C_{10}$ alkyl group; and
$R^9$ is a $C_1$-$C_{26}$ alkyl group.

7. The concrete composition of claim 6, wherein the organotin stabilizer is of Formula IA or IB, and $R^1$ and $R^2$ are independently a methyl, butyl, or octyl group.

8. The concrete composition of claim 6, wherein the organotin stabilizer is of Formula IC, wherein $R^1$ and $R^2$ are independently a butyl or octyl group.

9. The concrete composition of claim 1, wherein the stabilizer is a tin salt of maleic acid or a tin salt of a half ester of maleic acid.

10. The concrete composition of claim 1, wherein the stabilizer is a metal soap having the formula M-(OCOR$^{10}$)$_2$ wherein M is selected from the group consisting of zinc, barium, calcium, cadmium, and a mixture of any two or more thereof; and $R_{10}$ is a $C_8$-$C_{26}$ alkyl or a $C_8$-$C_{26}$ alkenyl group.

11. The concrete composition of claim 1, wherein the lead stabilizer comprises lead carboxylate, tribasic lead sulfate, dibasic lead stearate, lead stearate, lead phosphite, monobasic lead phthalate, lead carbonate, or dibasic lead phosphite.

12. The concrete composition of claim 1, wherein the organoantimony stabilizer is of formula Sb(SCH$_2$CO$_2$R$^8$)$_3$, wherein $R^8$ is a $C_1$-$C_{10}$ alkyl group.

13. The concrete composition of claim 1, wherein the epoxide stabilizer is an epoxy triglyceride or an alkyl epoxy stearate.

14. The concrete composition of claim 1, wherein the PVC has a weight average molecular weight ranging from about 10,000 g/mol to about 100,000 g/mol.

15. The concrete composition of claim 1, wherein the concrete composition comprises the PVC composition in an amount from about 2% to about 10% by weight of the concrete.

16. The concrete composition of claim 1, wherein the PVC composition is in the form of fibers.

17. The concrete composition of claim 1, wherein the concrete composition comprises fibers.

18. A concrete structure comprising rebar and the concrete composition of claim 1.

19. The concrete structure of claim 18, wherein the concrete structure is in contact with an aqueous solution of chloride ions ranging in concentration from about 0.1 wt % to about 36 wt % based on the total weight of the aqueous solution.

20. The concrete structure of claim 19, wherein the concrete structure is a part of a retaining wall, a brine tank, a reverse osmosis plant, a tunnel, a bridge, a bridge piling, a bridge foundation, a pier, a seawall, a dock, a ship, a barge, a desalination plant, or a chemical plant.

21. A method of manufacturing a reinforced concrete structure comprising encasing rebar in whole or in part with the concrete composition of claim 1 to provide the reinforced concrete structure.

22. A method of repairing a reinforced concrete structure comprising applying the concrete composition of claim 1 to any damaged area of the reinforced concrete structure.

23. A method of reducing or preventing corrosion of a reinforced concrete structure comprising applying the concrete composition of claim 1 to the surface of the reinforced concrete structure.

* * * * *

UNITED STATES PATENT AND TRADEMARK OFFICE
CERTIFICATE OF CORRECTION

PATENT NO. : 8,273,175 B2
APPLICATION NO. : 13/392800
DATED : September 25, 2012
INVENTOR(S) : Chen It is certified that error appears in the above-identified patent and that said Letters Patent is hereby corrected as shown below:

In Column 2, Line 41, delete "tort-butyl," and insert -- tert-butyl, --, therefor.

In Column 3, Line 8, delete "limitation." and insert -- limitation, --, therefor.

In Column 3, Line 12, delete "Ill." and insert -- III. --, therefor.

In Column 3, Line 19, delete "I." and insert -- Z. --, therefor.

In Column 4, Line 44, delete "$R^8$" and insert -- $R^8$; --, therefor.

In Column 4, Line 59, delete "hearing" and insert -- bearing --, therefor.

In Column 7, Line 23, delete "tillers" and insert -- fillers --, therefor.

In Column 8, in Table, under "Ingredient", Line 7, delete "sterate" and insert -- stearate --, therefor.

In Column 8, in Table, under "Ingredient", Line 8, delete "sterate" and insert -- stearate --, therefor.

In Column 9, Line 34, delete "curing," and insert -- curing --, therefor.

In Column 9, Line 51, delete "hours" and insert -- hours of --, therefor.

In Column 11, Line 24, delete "70 min" and insert -- 70 mm --, therefor.

In Column 11, Line 25, delete "in 50 mm" and insert -- in a 50 mm --, therefor.

In Column 13, Line 46, in Claim 6, delete "$R^8$" and insert -- $R^8$; --, therefor.

In Column 14, Line 8, in Claim 10, delete "$R_{10}$" and insert -- $R^{10}$ --, therefor.

Signed and Sealed this
Fifteenth Day of January, 2013

David J. Kappos
*Director of the United States Patent and Trademark Office*